April 10, 1956  C. K. RAYNSFORD  2,741,121
MEANS FOR MINIMIZING ELECTROSTATIC VOLTAGES IN A FLOWMETER
Filed June 17, 1952
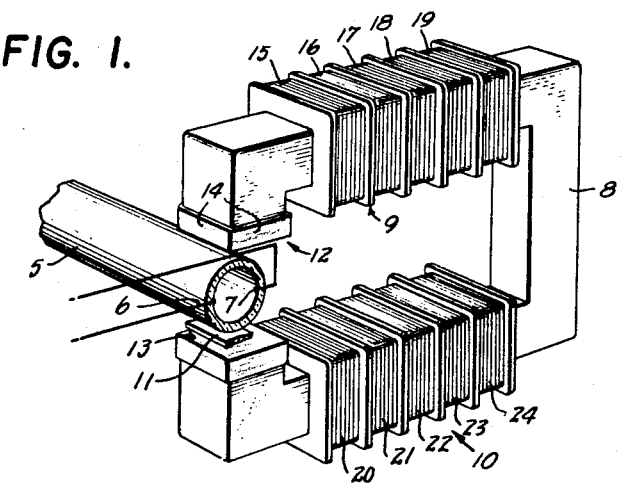
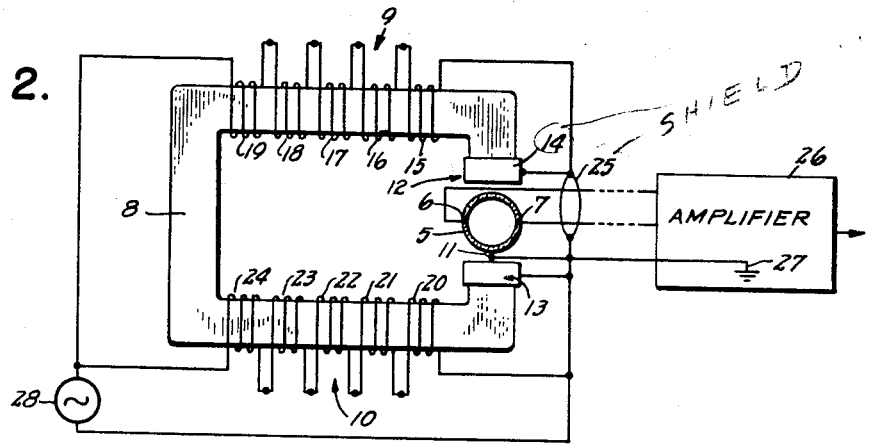
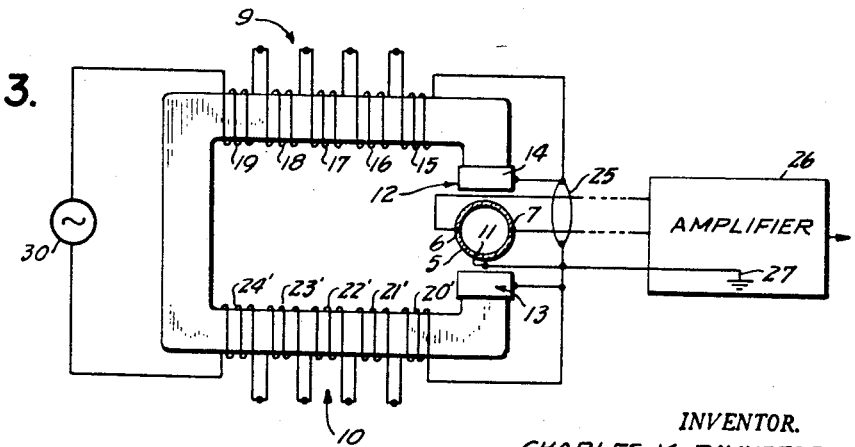
INVENTOR.
CHARLES K. RAYNSFORD
BY
Mitchell + Bechert
ATTORNEYS

United States Patent Office 2,741,121
Patented Apr. 10, 1956

2,741,121

MEANS FOR MINIMIZING ELECTROSTATIC VOLTAGES IN A FLOWMETER

Charles K. Raynsford, Summit, N. J., assignor to Vitro Corporation of America, New York, N. Y., a corporation of Delaware Application June 17, 1952, Serial No. 293,938

9 Claims. (Cl. 73—194)

My invention relates to a magnetic-induction flowmeter of the type in which flow is measured by observing the voltage induced across a flow tube in the presence of an alternating magnetic field.

In flowmeters of the character indicated, the voltages to be detected are extremely small and are often masked by spurious signals arising in many different ways. In particular, undesired extraneous signals may arise from electrostatically induced voltages.

It is, accordingly, an object of the invention to provide an improved flowmeter wherein electrostatically induced voltages are minimized.

It is a specific object to modify the core of the magnetic-excitation means for such a flowmeter, in order to minimize electrostatic induction in the flow tube.

It is a further specific object to provide a particular winding construction in a flowmeter of the character indicated with a view to minimizing electrostatic induction in the flow tube.

Other objects and various further features of novelty and invention will be pointed out, or will occur to those skilled in the art, from a reading of the following specification, in conjunction with the accompanying drawings. In said drawings, which show, for illustrative purposes only, preferred forms of the invention:

Fig. 1 is a simplified view in perspective and partly in section, showing sensing elements in a flowmeter incorporating features of the invention;

Fig. 2 is an electrical diagram schematically showing electrical connections for the device of Fig. 1; and Fig. 3 is a drawing similar to Fig. 2, but showing a modification.

Briefly stated, my invention contemplates means for reducing electrostatically induced voltages in the flow tube of a magnetic-induction flowmeter by treating both the core and the winding. Electrostatic voltages due to the presence of the core may be minimized by employment of novel pole shields, and similar voltages due to the presence of the winding may be minimized by a particular construction and orientation of the winding.

In Fig. 1 of the drawings, my invention is shown in application to a flowmeter comprising a flow tube 5 supporting a pair of electrodes 6—7 in spaced relation to the gap of a magnetic core 8. The magnet 8 may be excited by winding means 9—10 disposed on opposite sides of the core 8, symmetrically with respect to the gap in the core. The flow tube 5 may include grounding means, such as the strap 11, for reducing the inducement of extraneous voltages due to longitudinal currents, all as discussed more fully in the co-pending patent application of Charles K. Raynsford et al., Serial No. 283,329, filed April 21, 1952.

It has been found that in flowmeters of the character indicated both the winding means and the core may give rise to the electrostatic induction of undesired signals in the flow-measuring circuit 6—7. As to such signals as may be attributable to the core, I have found that the provision of pole shields will effect a substantial reduction. In the form shown, pole shields 12—13 are plates of conducting non-magnetic material laid over the exposed faces of the core at the gap, and for the purpose of mechanical rigidity, as well as of avoiding end-effect difficulties, I prefer that each of the shields 12—13 shall be a cap with overturned edges, as at 14, which may frictionally engage the adjacent sides of the magnet poles. The pole shields 12—13 may be grounded as will appear more clearly below.

In order to minimize undesired electrostatic coupling due to the presence of the winding means 9—10, I prefer so to construct the winding means 9—10 that essentially all high-potential turns are located relatively remote from the gap and so that essentially only the low-potential turns are near the gap. In a customary winding, many turns are required so that the coils must be wound in radially developed layers, that is, if the core dimensions are to be kept on a reasonable basis. This means that high potential turns may be in the same radial plane as low-potential turns, thus permitting establishment of such voltages near the gap as may account for undesired electrostatic coupling to the flow-measuring circuit 6—7. In accordance with the invention, I segregate the high-potential turns from the low-potential turns by providing a series of discrete or separate windings, such as the windings 15—16—17—18—19, to be connected to each other. In order to preserve balance in the configuration, I prefer that the coils 15—16—17—18—19 which constitute parts of the winding means 9 shall be essentially duplicates of the coils 20—21—22—23—24 which constitute the winding means 10, and that both sets of coils shall be arranged symmetrically with respect to the gap, as shown.

In the arrangement shown in Fig. 2, the individual coils of each of the sets of windings 9—10 are connected to each other in series, and the two sets are energized in parallel. The free ends of the windings 15—20 are connected to each other, and preferably at ground potential, as suggested by the illustrated common connections to the pole shields 12—13, to the ground strap 11, and to the shield means 25 for the electrode leads. This ground potential may be established at a neutral point in the amplifier 26 of signal-processing means, as suggested at 27 and as discussed in greater detail in the co-pending application of A. R. Soffel, Serial No. 283,328, filed April 21, 1952. The other free ends of the winding means 9—10, that is, the ends most remote from the gap in core 8, may be connected to each other, and excitation voltage from a source 28 may be applied between this point and the grounding point, as schematically indicated. It will be understood that in order to promote the generation of aiding fluxes in thec ore 8, the turns of winding means 9 should be in the opposite direction of those in winding means 10, as shown.

In Fig. 3, I show a generally similar employment of multiple coils for winding means 9—10, except that the high-potential ends of the coils are not connected to each other but are directly connected across the exciting source 30. This means that all coils are connected in series so that the winding turns of both sets 9—10 should be in the same direction, as shown.

In use, it will be seen that my arrangements assure the removal of all higher potentials from the vicinity of probing for the flow-induced voltage. With the connections of coils shown in both Figs. 2 and 3, each coil successively more remote from the gap will be at a higher potential, so that the higher potentials are developed only on the farthest coils. Furthermore, it will be noted that, particularly in the case shown in Fig. 2, the symmetrical arrangement of coils minimizes the development of potential differences between opposite parts of corresponding coils, even at the high-potential end. Thus, any such small couplings as may exist between the high-potential turns and the flow-measuring circuit will tend to be even further reduced.

It will be appreciated that I have described a relatively simple configuration for minimizing a troublesome source of spurious voltages in flowmeters of the character indicated. The thin coils constituting elements of both the winding means 9—10 may be readily fabricated and need entail no increase in bulk over that required for more conventional windings.

While I have described my invention in detail for the preferred forms shown, it will be understood that modifications may be made within the scope of the invention as defined in the claims which follow.

I claim:

1. In a flowmeter, magnetic-excitation means including a core with a gap, a flow tube in said gap and including a pair of opposed output electrodes oriented generally transverse to flow in said tube and to flux lines in said gap, winding means including two like sets of separate coils linked to said core in spaced relation along said core and symmetrically disposed about said gap on opposite sides of said core, each said coil being a separate multi-turn multi-layer winding, each set comprising a plurality of said coils, the adjacent coils of each set being connected to each other, the ends of the coils remote from the gap being adapted for connection to an energizing source, and the ends of the opposite coils nearest said gap being connected to each other.

2. A flowmeter according to claim 1, in which said remote ends are connected to each other, and in which the direction of turns of the windings of one set is opposite to the direction of turns linking the windings of the other set with respect to said core, and means connected on the one hand to said remote ends and on the other hand to the connection of said coils nearest said gap for exciting said windings in parallel.

3. A flowmeter according to claim 1, in which the direction of turns of both sets of windings is the same with respect to said core, and means connected to said remote ends for exciting said windings in series.

4. In a flowmeter, magnetic-excitation means including a core with a gap, a flow tube oriented generally transverse to flux lines in said gap, a plurality of independently wound multi-turn multi-layer coils separately linked in axially spaced relation to said core, said coils on each side of said gap being connected together in series, a grounding connection to the ends of the opposite coils nearest said gap, and means connected to the ends of said coils remote from said gap for exciting said coils in series.

5. In a flowmeter, magnetic-excitation means including a core with a gap, a flow tube oriented generally transverse to flux lines in said gap, a plurality of independently wound multi-turn multi-layer coils separately linked in axially spaced relation to said core, said coils on each side of said gap being connected together in series, a grounding connection to the ends of the opposite coils nearest said gap, a remote-end connection connecting the ends of the coils remote from said gap, and means connected to said grounding connection and to said remote-end connection for exciting said coils in parallel.

6. In a flowmeter, magnetic-excitation means including a core with a gap, means for establishing a fluid flow generally transverse to flux lines in said gap, electrode means spaced generally transverse to the flow direction and to flux lines in said gap, first and second separate pluralities of independently wound multi-turn multi-layer windings axially spaced on opposite sides of said core, adjacent ends of adjacent windings of each set being connected, grounding means for said flow tube and connected to the adjacent ends of the coils of each set nearest said gap, and source means including connections to the ends of the windings remote from said gap for exciting said windings.

7. A flowmeter according to claim 6, and separate pole-shielding means between each side of said flow tube and the poles of said core at said gap.

8. A flowmeter according to claim 7, in which said pole-shielding means comprises separate caps of conducting non-magnetic material covering the entire exposed faces of each pole of said core at said gap.

9. A flowmeter according to claim 7, in which said pole-shielding means are both grounded to said ground connection.

References Cited in the file of this patent

UNITED STATES PATENTS

| | | |
|---|---|---|
| 321,147 | Sprague | June 30, 1885 |
| 397,439 | Patten | Feb. 5, 1889 |
| 840,150 | Moody | Jan. 1, 1907 |
| 2,637,207 | De Boisblanc | May 5, 1953 |
| 2,696,737 | Mittelmann | Dec. 14, 1954 |

OTHER REFERENCES

An Electromagnetic Flowmeter for Transient Flow Studies, Jas. S. Arnold, pub. in Review of Scientific Instruments, vol. 22, No. 1, January 1951, pp. 43–47.

An Induction Flowmeter Design Suitable for Radioactive Liquids, W. G. James, pub. in Review of Scientific Instruments, vol. 22, No. 12, December 1951, pp. 989–1002.

Improved Apparatus and Technique for Electromagnetic Determination of Blood Flow, A. Kolin, pub. in Review of Scientific Instruments, vol. 23, No. 5, May 1952, pp. 235–242.